US012679213B2

(12) United States Patent
Pfeilschifter

(10) Patent No.: US 12,679,213 B2
(45) Date of Patent: Jul. 14, 2026

(54) PROTECTION DEVICE FOR VOLTAGE-LIMITING ELEMENTS OF A LOW-VOLTAGE LINE THAT EXTENDS OUT OF A VEHICLE HIGH-VOLTAGE REGION

(71) Applicant: Vitesco Technologies GmbH, Regensburg (DE)

(72) Inventor: Franz Pfeilschifter, Munich (DE)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 302 days.

(21) Appl. No.: 18/286,265

(22) PCT Filed: Mar. 28, 2022

(86) PCT No.: PCT/EP2022/058093
§ 371 (c)(1),
(2) Date: Oct. 10, 2023

(87) PCT Pub. No.: WO2022/223240
PCT Pub. Date: Oct. 27, 2022

(65) Prior Publication Data
US 2025/0074198 A1 Mar. 6, 2025

(30) Foreign Application Priority Data
Apr. 19, 2021 (DE) ..................... 10 2021 203 889.1

(51) Int. Cl.
*B60L 3/04* (2006.01)
*B60L 3/00* (2019.01)
*H02H 9/04* (2006.01)

(52) U.S. Cl.
CPC .............. *B60L 3/04* (2013.01); *B60L 3/0069* (2013.01); *H02H 9/041* (2013.01); *H02H 9/042* (2013.01); *B60Y 2200/91* (2013.01)

(58) Field of Classification Search
CPC ...... B60L 3/0069; B60L 3/04; B60Y 2200/91; H02H 9/041; H02H 9/042
(Continued)

(56) References Cited

U.S. PATENT DOCUMENTS

| | | | |
|---|---|---|---|
| 3,829,717 A | 8/1974 | Harrison | |
| 2013/0107409 A1* | 5/2013 | Mcgee | H02H 9/02 |
| | | | 361/91.1 |

FOREIGN PATENT DOCUMENTS

| | | |
|---|---|---|
| CN | 104040817 A | 9/2014 |
| CN | 205871758 U | 1/2017 |
(Continued)

OTHER PUBLICATIONS

Machine translation of Sparka German Patent Document DE 102009046471 A1 May 2011 (Year: 2011).*
(Continued)

*Primary Examiner* — Kevin J Comber
(74) *Attorney, Agent, or Firm* — Buchanan Ingersoll & Rooney PC

(57) ABSTRACT

The invention relates to a protection device for voltage-limiting elements of a low-voltage line that extends out of a vehicle high-voltage region. A vehicle high-voltage device having a high-voltage region (HV), which is arranged in a housing (G), and having at least one low-voltage line (NL) is described. Said low-voltage line leaves the high-voltage region (HV) through an aperture (D). The high-voltage region is provided in the housing (G). The aperture (D) is provided in an outwardly delimiting housing wall (GW) of the housing (G). The at least one low-voltage line (NL) is connected to a ground potential (M) or to a connection therefor via a voltage-limiting element (V) and a current-limiting element (SG) connected in series with said voltage-limiting element.

12 Claims, 2 Drawing Sheets

(58) Field of Classification Search
USPC ........................................................ 361/56
See application file for complete search history.

(56) References Cited

FOREIGN PATENT DOCUMENTS

| | | | |
|---|---|---|---|
| CN | 106660458 | A | 5/2017 |
| CN | 107230972 | A | 10/2017 |
| CN | 109130864 | A | 1/2019 |
| CN | 209282835 | U | 8/2019 |
| DE | 10247308 | B3 | 5/2004 |
| DE | 102009046471 | A1 * 5/2011 ........... H01H 85/044 |
| DE | 10 2013 018 404 | A1 | 5/2015 |
| DE | 102014002819 | A1 | 8/2015 |
| DE | 102016123209 | A1 | 6/2018 |
| JP | 2016-000577 | A | 1/2016 |
| WO | 2016189135 | A1 | 12/2016 |

OTHER PUBLICATIONS

Office Action (Notice of Decision for Rejection) issued Jul. 23, 2025, by the Korean Intellectual Property Office in corresponding Korean Patent Application No. 10-2023-7039456 and an English translation of the Office Action. (5 pages).

Office Action (Notice to Submit Response) issued Nov. 16, 2024, by the Korean Intellectual Property Office in corresponding Korean Patent Application No. 10-2023-7039456 and an English translation of the Office Action. (9 pages).

International Search Report and Written Opinion for International Application No. PCT/EP2022/058093, mailed Aug. 1, 2022, 19 pages.

International Search Report and Written Opinion for International Application No. PCT/EP2022/058093, mailed Aug. 1, 2022, 17 pages (German).

German Examination Report for German Application No. 10 2021 203 889.1, dated Jan. 18, 2022 with translation, 10 pages.

Office Action (The First Office Action) issued Apr. 2, 2026 by the State Intellectual Property Office of People's Republic of China in corresponding Chinese Patent Application No. 202280029691.0 and an English translation of the Office Action. (19 pages).

* cited by examiner

PROTECTION DEVICE FOR VOLTAGE-LIMITING ELEMENTS OF A LOW-VOLTAGE LINE THAT EXTENDS OUT OF A VEHICLE HIGH-VOLTAGE REGION

CROSS REFERENCE TO RELATED APPLICATIONS

This application is the U.S. National Phase Application of PCT International Application No. PCT/EP2022/058093, filed Mar. 28, 2022, which claims priority to German Patent Application No. 10 2021 203 889.1, filed Apr. 19, 2021, the contents of such applications being incorporated by reference herein.

BACKGROUND OF THE INVENTION

It is known practice to equip vehicles with an electrical drive or other electrical components. In order to achieve high powers, particularly for traction, use is made of high voltages, for example of 400 volts or more, which, in contrast to the otherwise customary 12 volt on-board electrical systems, can pose a danger to people.

For this reason, vehicles that have an on-board electrical system with high voltage (i.e. a high-voltage on-board electrical system—HV on-board electrical system), are provided in a housing, by means of which a high-voltage region (HV region) is physically separated from the environment of the housing. However, low-voltage lines lead out of the housing for signal purposes for example. If an insulation fault occurs inside the high-voltage region, which leads to a connection of a high-voltage potential of the high-voltage region to one of the low-voltage lines, then there is the danger of a dangerous contact voltage, particularly as the insulation of the low-voltage lines (outside of the high-voltage region) is not configured for the voltages of the HV on-board electrical system. voltage line are transferred to others, but the voltage-limiting element is similarly triggered in the event of an insulation fault. This is also protected in this configuration, as in other embodiments, by the current-limiting element, which limits the current intensity or the increase thereof (for the voltage-limiting element).

Embodiments are described, in which the components used for protection are provided on or in the outlet. The components used for protection comprise: the at least one voltage-limiting element and/or the at least one current-limiting element (preferably also the relevant connecting points to the at least one low-voltage line and/or the connecting elements, if present). These components may be provided on the inner side or outer side or in a bushing of the housing wall, particularly at the point on the housing wall at which the outlet is located. These components can be provided in a module, for example in a module housing or can be provided as an insulator-encapsulated module. The module can be arranged at the outlet (on the inner side or outer side of the housing wall) or in the outlet. In particular, the module may directly physically adjoin a cable leadthrough, through which the at least one low-voltage line is led. The cable leadthrough extends through the outlet or through a passage opening, which realizes the outlet. Corresponding variants are presented in the following.

The at least one voltage-limiting element and/or the current-limiting element may be provided in a module. This is preferably arranged on an inner side of the housing wall at the outlet. Furthermore, a cable leadthrough may be provided in the outlet, through which the at least one low-voltage line is led, and the at least one voltage-limiting element and the current-limiting element are provided in the cable leadthrough. Furthermore, the at least one low-voltage line may lead to a plug-in connection device that is arranged in the outlet and/or on an outer side of the housing wall at the outlet. The at least one voltage-limiting element and/or the current-limiting element can be integrated in the plug-in connection device or can be arranged on the plug-in connection device, preferably directly or physically adjacent. A physical integration of the voltage-limiting element or the voltage-limiting elements and the current-limiting element with the plug-in connection device to which the at least one low-voltage line leads is one option for compact realization. Here, the voltage-limiting element and/or the current-limiting element can be arranged in a housing of the plug-in connection device or directly on a housing of the plug-in connection device ("plug-in connection housing"). In the latter case, preferably as a separate housed or encapsulated module, which directly adjoins the plug-in connection housing in particular. The plug-in connection device is for example a signal jack or a signal plug with a plurality of contacts, to which in each case one separate low-voltage line leads or is connected to the same. This plug-in connection device preferably leads through the outlet of the housing wall from the interior (high-voltage region) into the environment of the housing, in which the high-voltage region is located. In other words, the plug-in connection device is located in the interior of the housing in which the high-voltage region is located or is connected to the low-voltage lines on the inner side of the housing wall and can be electrically contacted from outside this housing by plugging in a complementary (low-voltage) plug-in device, which is used in particular for continuing the low-voltage lines in the external region of this housing. The contacts of the plug-in device can be located in the plug-in connection housing, which contacts are connected to the low-voltage lines, where the voltage- and current-limiting elements—preferably also the connecting elements, if present—are also preferably located. These elements are electrically insulated from the contacts by an insulating device. The insulating device is likewise preferably located in the plug-in connection housing.

The current-limiting element can be formed as a resistor or as an inductor or have a resistance and/or an inductance. The current-limiting element can be provided as a series circuit of a resistor and an inductor. If the current-limiting element comprises a resistor, then this resistor is used to limit the current. The resistor is configured in such a way that in the case of a maximum voltage or nominal voltage of the high-voltage region or components thereof, the maximum peak current of the voltage-limiting element is not exceeded. The voltage-limiting element can be designed with a maximum peak current of at least 500 A or of at least 5000 A or 8000 A. The resistance may be 0.1-10 ohms (depending on the voltage in the high-voltage region). The inductance may have a value of 1 µH or more, for example 5 µH or 10 µH or 20 µH. As a result, the rate of increase in current is limited in the event of a sudden insulation fault or a contact current that begins suddenly, so that over an initial time window, the current remains below a value that could be damaging for the voltage-limiting element. Further measures such as shutdown or discharge can be implemented in this time window.

The at least one low-voltage line may be a low-voltage supply line (for 12 V, 14 V, 24 V, 5 V), may be a communication line (for a CAN bus, for a LAN connection or for a proprietary signal transmission), for example for transmitting signals that characterize an operating state (error signal, idle signal, activation signal, etc.), may be a control line (for activating a component inside the high-voltage region) or may be a sensor line, for example of a temperature, current, voltage, magnetic-field, speed or torque sensor, or else of a battery management system. It is common to these lines that the level thereof during fault-free operation does not exceed a limit such as for example 60 V, 40 V, 20 V or 14 V or 12 V.

The voltage-limiting element can be formed as a varistor, gas discharge tube, spark gap, protective diode, thyristor circuit, TVS thyristor, DIAC, Zener diode, suppressor diode, four-layer diode or combination thereof. The voltage-limiting element can be provided as an individual element or as a bundle of parallel-connected identical individual elements which can be designed as explained previously.

The voltage-limiting element is set up with a voltage threshold from which the voltage-limiting element conducts. This threshold preferably corresponds to the breakdown voltage. This may be at least 40 V, 60 V, 400 V, 450 V or more than 600 V. In one embodiment in particular, the breakdown voltage is 30-35 volts. The threshold is greater than the maximum of all maximum voltages of all low-voltage lines which pass through the outlet (or are continued through the outlet).

The high-voltage region is preferably configured for nominal voltages of at least 400 V or 600 V or 800 V. The at least one low-voltage line can be configured for a maximum voltage of not more than 40 V, 20 V, 14 V or 5 V in fault-free operation. This corresponds to the maximum levels during fault-free signal transmission or during fault-free (low) voltage supply.

The current-limiting element is configured to limit a current flowing through the current-limiting element (or the voltage-limiting element) to a maximum current value. The maximum peak current configuration of the voltage-limiting element is greater than the maximum current value of the current-limiting element. In other words, the current-limiting element is configured to limit the current or the increase in current in such a way that the operating range of the voltage-limiting element is not exceeded.

DETAILED DESCRIPTION OF THE PREFERRED EMBODIMENTS

Figure 1:
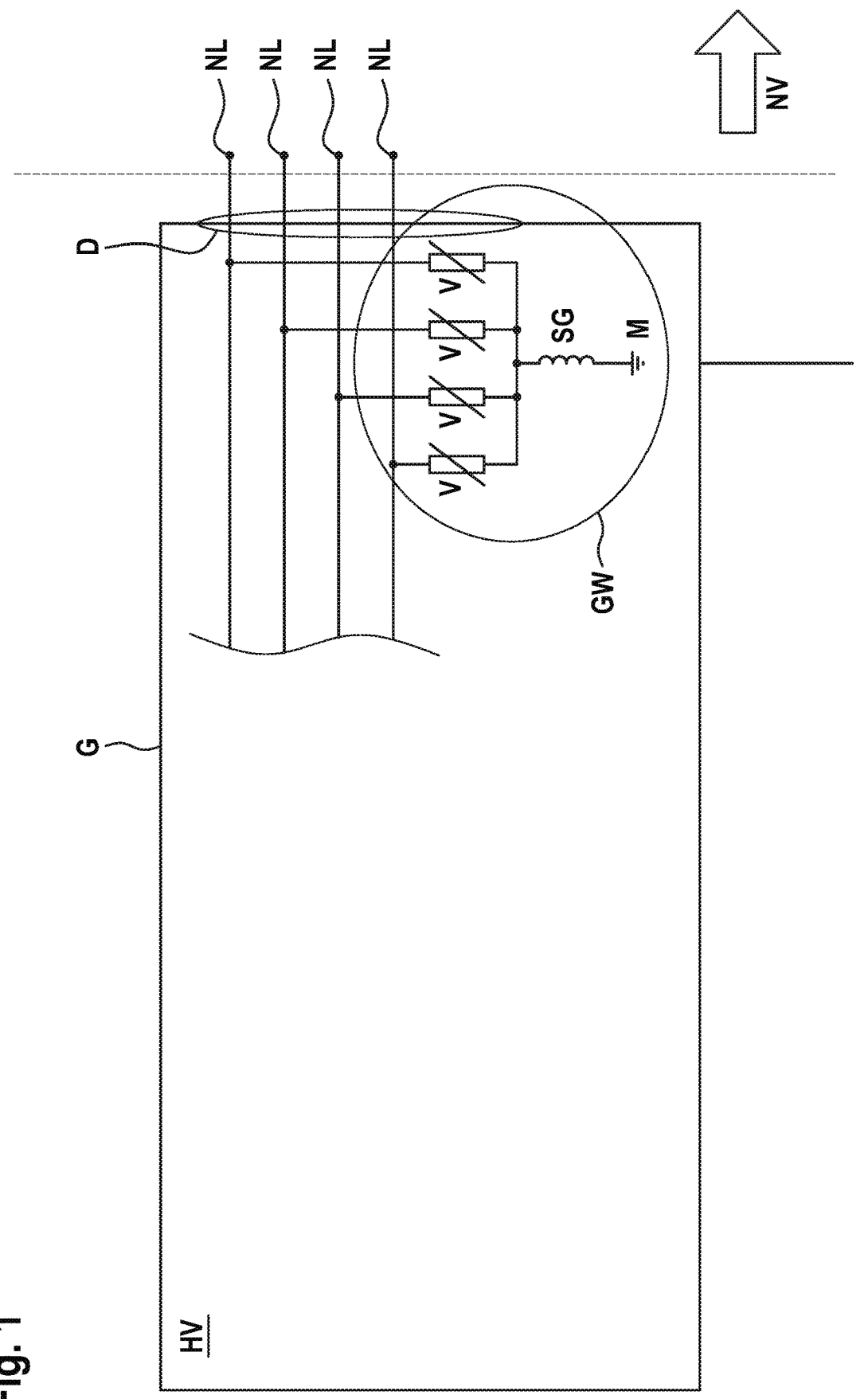
FIGS. 1-3 are used to explain the device described here.

FIG. 1 shows a vehicle high-voltage device having a high-voltage region HV and a housing G in which the high-voltage region HV is arranged. The housing G encloses the high-voltage region HV in a physical manner, as a result of which the high-voltage region is protected from access from outside. There is a plurality of low-voltage lines NL that pass out of the high-voltage region HV and in particular out of the housing G. These low-voltage lines are used for example for the low-voltage supply of components inside the housing or the high-voltage region or else for communication with these components, for example for the activation thereof, or to transmit (low-voltage) signals from these components to the exterior of the housing by means of a low-voltage line, for example in the case of a sensor as one of the components.

The low voltage lines NL are therefore used for low-voltage signal transmission between components inside the high-voltage region HV and a component outside the illustrated high-voltage region HV, i.e. components in a low-voltage region NV. Alternatively or additionally, the low-voltage lines NL are used for low-voltage supply of components inside the high-voltage region. Components of this type inside the high-voltage region HV are low-voltage components (sensors, drive circuits, communication devices, etc.) or in general components, which receive and/or emit a low-voltage signal or level (communication signal or low supply voltage). These may be components with a low-voltage section or may be low-voltage components.

The low-voltage lines NL are led out of the high-voltage region HV (or the housing G) through an outlet D, i.e. into a region outside of the high-voltage region HV or the housing G. The housing G and in particular a housing wall GW separates the high-voltage region HV from the region outside of the high-voltage region HV or the housing G.

The outlet D is provided in an outwardly delimiting housing wall GW of the housing G. The outlet D is formed as a passage opening.

In order to constitute protection from a high-voltage potential that may occur in the event of an insulation fault on one of the low-voltage lines NL, the low-voltage lines are connected via at least one voltage-limiting element V and a current-limiting element SG, which is connected in series thereto, to a ground potential M (or a different discharge potential) or to a connection for the same.

The series arrangement ensures that the current is limited by the voltage-limiting element V that is used for overvoltage protection, wherein the current-limiting element SG limits the rate of increase and/or the current amplitude itself.

In FIG. 1, this is realized by the four voltage-limiting elements V (varistors), which connect each of the four low-voltage lines NL individually via the (common) current-limiting element SG. As a result, only one current-limiting element is necessary for a plurality of voltage-limiting elements V or low-voltage lines NL. An inductor is illustrated as current-limiting element. The inductor limits the current particularly at the beginning of a corresponding insulation fault and therefore limits the rate of increase in current. Due to limitation of the increase in current (rate of increase in current), the current is limited at least for a time window at the start of the occurrence of the insulation fault. This time window can be used for triggering further safety mechanisms. Limitation of the current is therefore also to be understood to mean the limitation of a current at the start of the occurrence of an insulation fault. Instead of the illustrated inductor, a resistor or a series circuit of an inductor and a resistor can be used.

Figure 2:
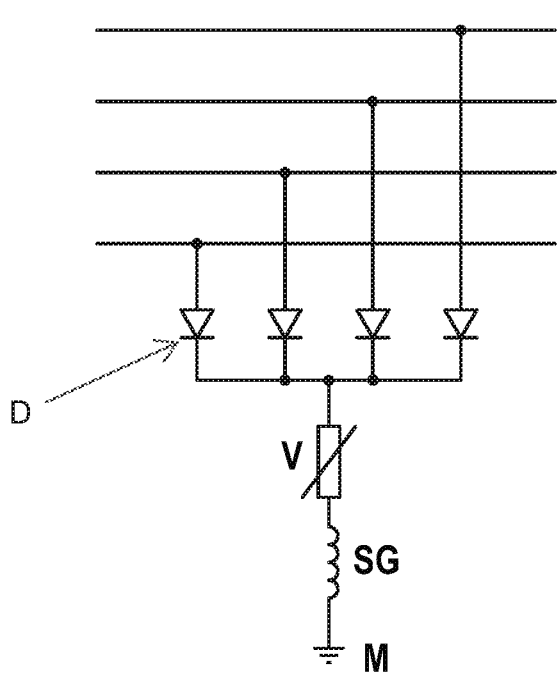

One further option, as shown in FIG. 2, is to use a plurality of connecting elements such as diodes D instead of the plurality of voltage-limiting elements V illustrated, wherein instead of the current-limiting element SG illustrated, a series circuit of a current-limiting element SG and a voltage-limiting element V is used. As a result, voltage-limiting elements V can be saved, wherein the connecting elements are less expensive and therefore costs can be saved overall.

Figure 3:
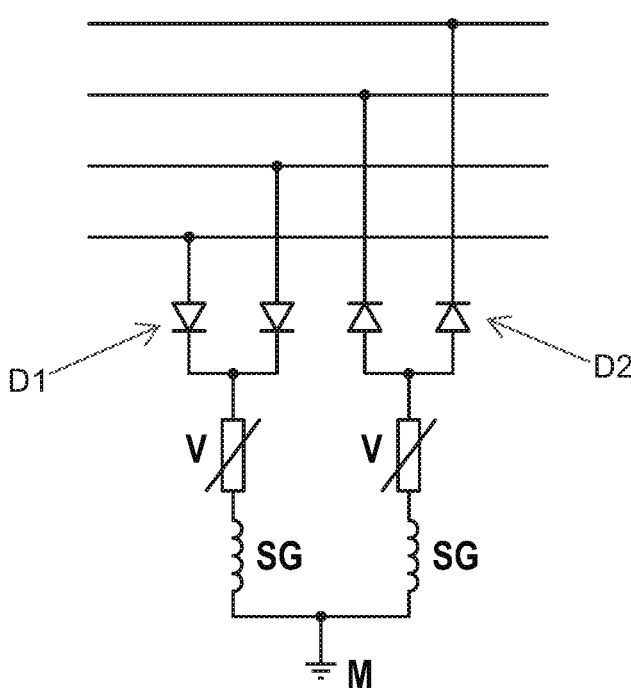

This can also be realized in a two-pole manner, as shown in FIG. 3, in that a first group of diodes is connected to the low-voltage lines NL and this first group of diodes D1 is connected via a common current-limiting element SG and a voltage-limiting element V to the ground potential, wherein the forward direction of all diodes of the first group points to the ground potential. As a result, the discharge is created for one of two polarities. A second group of diodes is connected to the low-voltage lines NL and this second group of diodes D2 is connected via a further common current-limiting element SG and a further voltage-limiting element V to the ground potential, wherein the forward direction of all diodes of the second group points away from the ground potential. As a result, the discharge is created for one of two polarities. The common current-limiting element and the voltage-limiting element are connected in series. This also applies for the further common current-limiting element SG and the further voltage-limiting element V.

It is illustrated symbolically that the plurality of low-voltage lines NL extend through the outlet D. The outlet separates the high-voltage region from a region outside of the housing G, particularly from a low-voltage region NV. More exacting insulation specifications apply in the high-voltage region HV than in the low-voltage region NV. Components of the low-voltage region NV should not therefore be loaded with the potentials or voltages of the high-voltage region, as appropriate insulation ratings apply only inside the high-voltage region HV (particularly with regard to max. operating voltage, permissible insulation voltage, etc.). An LV plug may be provided, which extends through the passage or which connects directly to the passage on the other side of the passage (with respect to the region HV). The voltage-limiting elements V and the current-limiting element SG are preferably also provided there. In further embodiments, the voltage-limiting element, the current-limiting element, the further voltage-limiting element and the current-limiting element and also the connecting elements are provided there. These may be accommodated in a module or module housing. The voltage-limiting and current-limiting elements are preferably insulated in accordance with an insulation rating that also applies for the HV region or that demands stricter measures than the same. This is used for protecting the elements mentioned in the event of an insulation fault. The module or module housing is preferably provided directly on or in a housing of a plug-in connection device, which contains the low-voltage lines NL. The end points of the lines NL, which are illustrated on the right, may be contacts of an LV plug-in connection device, for example a signal plug-in device (signal jack, signal connector), which is arranged on the housing G of the HV region (particularly at the passage D) and which offers a connection option for the LV region. The plug-in connection device is preferably insulated in accordance with the expected operating voltages or the maximum voltage or insulation rated voltage of the high-voltage region HV.

The invention claimed is:

1. A vehicle high-voltage device having a high-voltage region, which is arranged in a housing, and having at least one low-voltage line, which passes out of the high-voltage region through an outlet, wherein the outlet is provided in an outwardly delimiting housing wall of the housing, wherein the at least one low-voltage line is connected via a voltage-limiting element and a current-limiting element, wherein the voltage-limiting element is connected in series with the current-limiting element, and the current limiting element is connected to a single ground potential or to a connection for the single ground potential.

2. The vehicle high-voltage device as claimed in claim 1, wherein a plurality of low-voltage lines are present, which are in each case connected via a respective voltage-limiting element to a common current-limiting element, wherein the common current-limiting element is connected to the single ground potential or to the connection for the single ground potential.

3. The vehicle high-voltage device as claimed in claim 1, wherein a plurality of low-voltage lines are present, which are in each case connected via a connecting element to a series circuit that leads to the single ground potential or to the connection for the single ground potential, wherein the series circuit has a common voltage-limiting element and a common current-limiting element that is connected in series thereto.

4. The vehicle high-voltage device as claimed in claim 3, wherein the connecting element is a diode.

5. The vehicle high-voltage device as claimed in claim 1, wherein the at least one voltage-limiting element and the current-limiting element are provided in a module, which is provided on an inner side of the housing wall at the outlet, or a cable leadthrough is provided in the outlet, through which the at least one low-voltage line is led, and the at least one voltage-limiting element and the current-limiting element are provided in the cable leadthrough, or the at least one low-voltage line leads to a plug-in connection device that is arranged in the outlet and/or on an outer side of the housing wall at the outlet and the at least one voltage-limiting element and the current-limiting element is integrated in the plug-in connection device or is arranged directly on the plug-in connection device.

6. The vehicle high-voltage device as claimed in claim 1, wherein the current-limiting element, which is provided for limiting the current or the increase in current through the voltage-limiting element, is a resistor and/or an inductor.

7. The vehicle high-voltage device as claimed in claim 1, wherein the at least one low-voltage line has a low-voltage supply line, a communication line, a control line or sensor line.

8. The vehicle high-voltage device as claimed in claim 1, wherein the voltage-limiting element comprises a varistor, a gas discharge tube, a spark gap, a protective diode, a thyristor circuit, a TVS thyristor, a DIAC, a Zener diode, a suppressor diode and/or a four-layer diode.

9. The vehicle high-voltage device as claimed in claim 1, wherein the voltage-limiting element is set up with a voltage threshold from which the voltage-limiting element conducts, which voltage threshold is at least 40 V, 60 V, 400 V, 450 V or more than 600 V.

10. The vehicle high-voltage device as claimed in claim 1, wherein the high-voltage region is configured for nominal voltages of at least 400 V or 800 V and the at least one low-voltage line is configured for a maximum voltage of not more than 40 V, 20 V, 14 V or 5 V in fault-free operation.

11. The vehicle high-voltage device as claimed in claim 1, wherein the current-limiting element is configured to limit a current flowing through this element to a maximum current value, and wherein the maximum peak current configuration of the voltage-limiting element is greater than the maximum current value of the current-limiting element.

12. The vehicle high-voltage device as claimed in claim 1, wherein a plurality of low-voltage lines are present, wherein a first number of the plurality of low voltage lines are connected to a respective anode of a diode, a corresponding cathode of which is in each case connected to a first series circuit that leads to the single ground potential or to the connection for the single ground potential, wherein the first series circuit has a first common voltage-limiting element and a first common current-limiting element that is connected in series thereto, and wherein a second number of the plurality of low voltage lines are connected to a respective cathode of a diode, a corresponding anode of which is in each case connected to a second series circuit that leads to the single ground potential or to the connection for the single ground potential, wherein the second series circuit has a second common voltage-limiting element and a second common current-limiting element that is connected in series thereto.

*    *    *    *    *